US011680757B2

(12) United States Patent
Vitse

(10) Patent No.: US 11,680,757 B2
(45) Date of Patent: Jun. 20, 2023

(54) SYSTEM AND METHOD FOR HEAT EXCHANGER CONTROL BASED ON REAL-TIME CORROSION MONITORING

(71) Applicant: GENERAL ELECTRIC TECHNOLOGY GMBH, Baden (CH)

(72) Inventor: Frederic Vitse, West Hartford, CT (US)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 116 days.

(21) Appl. No.: 16/924,407

(22) Filed: Jul. 9, 2020

(65) Prior Publication Data

US 2022/0011062 A1   Jan. 13, 2022

(51) Int. Cl.
*F28F 27/00* (2006.01)
*F28F 19/00* (2006.01)
(Continued)

(52) U.S. Cl.
CPC .............. *F28F 27/00* (2013.01); *F28F 19/00* (2013.01); *F28F 27/02* (2013.01); *F22B 37/025* (2013.01); *F28F 2200/00* (2013.01)

(58) Field of Classification Search
CPC ........ F28F 2265/00; F28F 19/00; F28F 27/00; F28F 27/02; F28F 2200/00; F22B 37/025;
(Continued)

(56) References Cited

U.S. PATENT DOCUMENTS 4,776,391 A   10/1988 Warner
4,799,461 A   1/1989 Shigenaka et al.
(Continued)

FOREIGN PATENT DOCUMENTS

DE           2810352        8/1979
DE   102013007529 B3 *  5/2014  ........... G01N 17/043
(Continued)

OTHER PUBLICATIONS

International Search Report issued in corresponding PCT Application No. PCT/IB21/56056 dated Sep. 14, 2021.

*Primary Examiner* — Tavia Sullens
*Assistant Examiner* — Khaled Ahmed Ali Al Samiri
(74) *Attorney, Agent, or Firm* — Grogan, Tuccillo & Vanderleeden, LLP

(57) ABSTRACT

A system and method of controlling corrosion of a heat exchanger, having a hot gas inlet and outlet and a cold side inlet and outlet. The method includes determining a temperature of the heat exchanger at a first selected location, controlling a temperature of a corrosion sensing device to a first selected temperature based on the temperature of the surface of the heat exchanger and determining a corrosion rate associated with the heat exchanger surface at the first selected location for the first selected temperature. The method also includes comparing the corrosion rate to an expected corrosion rate, determining a cold side fluid inlet temperature target for the heat exchanger based at least in part on the comparing, the determined corrosion; and controlling a cold side fluid inlet temperature based at least in part on the determined inlet temperature target, determined corrosion rate, and expected corrosion rate.

18 Claims, 5 Drawing Sheets

(51) Int. Cl.
*F28F 27/02* (2006.01)
*F22B 37/02* (2006.01)

(58) Field of Classification Search
CPC ... F22B 35/007; F23N 2229/18; G01N 17/04; G01N 17/43; C02F 2303/08; F23G 5/48
See application file for complete search history.

(56) References Cited

U.S. PATENT DOCUMENTS

| | | |
|---|---|---|
| 5,361,284 A | 11/1994 | Baum et al. |
| 5,712,559 A | 1/1998 | Moore et al. |
| 7,310,877 B2 | 12/2007 | Cao et al. |
| 8,290,111 B1 | 10/2012 | Pop et al. |
| 9,726,594 B2 * | 8/2017 | Jovancicevic ......... G01N 17/02 |
| 2007/0159187 A1 | 7/2007 | Chen et al. |
| 2014/0083659 A1 | 3/2014 | Corry et al. |
| 2019/0345616 A1 | 11/2019 | Maddela et al. |
| 2019/0368833 A1 | 12/2019 | Dale et al. |

FOREIGN PATENT DOCUMENTS

| | | | |
|---|---|---|---|
| GB | 1357573 | 6/1974 | |
| JP | 2006258603 A * | 9/2006 | ............. G01N 17/02 |
| KR | 20190027669 | 3/2019 | |

* cited by examiner

SYSTEM AND METHOD FOR HEAT EXCHANGER CONTROL BASED ON REAL-TIME CORROSION MONITORING

TECHNICAL FIELD

Embodiments as described herein relate generally to evaluation and control methods and systems for heat exchangers. More particularly, a method of and system for evaluating data representing the corrosion characteristics of combustion vessel heat exchangers particularly as may be employed to control inlet temperatures of heat exchangers.

BACKGROUND

A boiler typically includes a furnace in which fuel is burned to generate heat to produce steam. The combustion of the fuel creates thermal energy or heat, which is used to heat and vaporize a liquid, such as water, which makes steam. The generated steam may be used to drive a turbine to generate electricity or to provide heat for other purposes. Fossil fuels, such as pulverized coal, natural gas and the like are typical fuels used in many combustion systems for boilers. When combusting the fuel, heat is generated and soot as well as flue gases are formed.

The walls of a combustion vessel are frequently made up of a series of heat exchange tubes filled with a heat exchange medium (typically water) and may be referred to as a "water wall". One side of the water wall faces the combustion chamber and is exposed to the products of combustion, which may include hot gases, ash and corrosive combustion by-products. Similarly, boiler systems also include other heat exchangers, e.g., superheater, reheater, and economizer that are exposed to combustion flue gases for heating. Combustion of fuels such as coal result in soot and ash deposits on the inside surface of the heat exchange surfaces in the heat exchangers and boiler, impairing heat transfer from the heated gases in the combustion vessel to the water tubes and heat exchanger. The wall of a combustion vessel or a heat exchanger can corrode over time as a result of corrosive materials in the ash deposited by the fossil fuel consumed or physical degradation caused by, for example, solid waste consumed in a trash-to-energy plant. This corrosion reduces the wall thickness of the tubes in the water wall or heat exchanger. The walls of heat exchange surfaces must be maintained at a minimum thickness to reliably withstand the high temperatures and pressures in the water/steam tubes or heat exchanger. These negative effects of flue-gas side corrosion on boiler materials (pressure-bearing or as protective layers/retaining parts/sheet metals) or in flue gas cleaning have resulted in a continual search for more resistant materials. However, the selection of materials is limited based on environmental conditions in the boiler, flue gas temperature, flue gas chemistry, the chemistry of the fouling, erosion, etc.) and by the expected performance features (lifetime, reparability, function within composite materials etc.). As a result, boiler corrosion and the functional failure of boilers and flue gas cleaning demonstrate that relevant environmental conditions can be highly varying and inconsistent, thus complicating the forecast of the performance features of the materials employed.

Consequently, "online" material tests have emerged where probes are inserted in the respective boiler at the projected application site in order to record the material's performance features. Material probes (e.g. around 70 cm long) have been used where the probe's body is a real component (same material) in terms of size (boiler tube, solid material), with corresponding applications (e.g. protective layers) as appropriate. These large probes are internally cooled to maintain temperatures for the front part of the probe body. The temperatures are set within a freely selectable, constant temperature range, i.e. the "material temperature" is recorded simultaneously over a broad temperature range. Critical temperature threshold values are thus detected. In these examples, the probe body can be used for an extended time period which is, for the most part, freely selectable, from hours to months. Following its on-site application—and similar to damage investigations—the probe's body is disassembled in the lab and undergoes microanalytical testing to record the causes, type and intensity of corrosion (degradation rate), or the adverse effects on its functionality. Within this temperature range "all" temperatures of relevance can be examined equivalently (e.g. ranging from 250°–300° C. for evaporators, from 400° C.-500° C. for superheaters, or from 80° C.-200° C. for an economizer or preheater and with regard to flue gases).

Proper maintenance of the combustion vessel typically requires periodic shutdown for inspection, cleaning and repair of critical components. Current diagnostic probes require long testing to evaluate corrosion. If the expenses associated with plant shutdown are to be avoided without compromising safety, physical and operational conditions within the combustion vessel must be carefully monitored and evaluated to detect dangerous conditions. For these reasons, it would be desirable to provide non-intrusive on-line monitoring systems which are configured to evaluate the physical characteristics of critical portions of the heat exchangers and the like to determine the temperature based corrosion characteristics in the combustion system and/or flow through respective heat exchangers.

BRIEF DESCRIPTION

In an embodiment, described herein is a method of controlling corrosion of a heat exchanger, having a hot gas inlet and outlet and a cold side inlet and outlet. The method includes determining a temperature of the heat exchanger at a first selected location, controlling a temperature of a corrosion sensing device to a first selected temperature based on the temperature of the surface of the heat exchanger and determining a corrosion rate associated with the heat exchanger surface at the first selected location for the first selected temperature. The method also includes comparing the corrosion rate to an expected corrosion rate, determining a cold side fluid inlet temperature target for the heat exchanger based at least in part on the comparing step, and controlling a cold side fluid inlet temperature based at least in part on the determined inlet temperature target, determined corrosion rate, and expected corrosion rate.

In another embodiment, described herein is a system for monitoring corrosion of a heat exchange surface of a heat exchanger. The system including a heat exchanger, having a hot gas inlet, a hot gas outlet, a cold side inlet and a cold side outlet, a corrosion sensing device disposed at a first selected location at the heat exchange surface of the heat exchanger, the corrosion sensing device operable to measure a corrosion rate of the heat exchange surface for a first selected temperature, a temperature compensation device controllable and operable to control the temperature of the corrosion sensing device, and a temperature sensing device disposed in proximity to the first selected location, the temperature sensing device operable to measure a temperature of the heat exchanger at the first selected location. The system also includes a control device operable to control at least one of the temperature and flow of a heat exchange medium to the cold side inlet through the heat exchanger, and a controller in operable communication with the corrosion sensing device, the temperature compensation device, the temperature sensor and control device. At least one of the corrosion sensing device and the controller is operable to control the temperature compensation device to maintain the corrosion sensing device at the first selected temperature based at least in part on the temperature of the heat exchanger at the first selected location. At least one of the corrosion sensing device and the controller is operable to determine a corrosion rate of the heat exchange surface of the heat exchanger at the first selected location and execute a process for controlling a cold side inlet temperature of the heat exchanger based at least in part on the corrosion measured at the first location, an expected corrosion rate for the heat exchanger at the measured temperature of the heat exchanger at the first selected location.

Additional features and advantages are realized through the techniques of the present disclosure. Other embodiments and aspects of the disclosure are described in detail herein. For a better understanding of the disclosure with the advantages and the features, refer to the description and to the drawings.

DRAWINGS

The described embodiments will be better understood from reading the following description of non-limiting embodiments, with reference to the attached drawings, wherein below:

DETAILED DESCRIPTION

Figure 1:
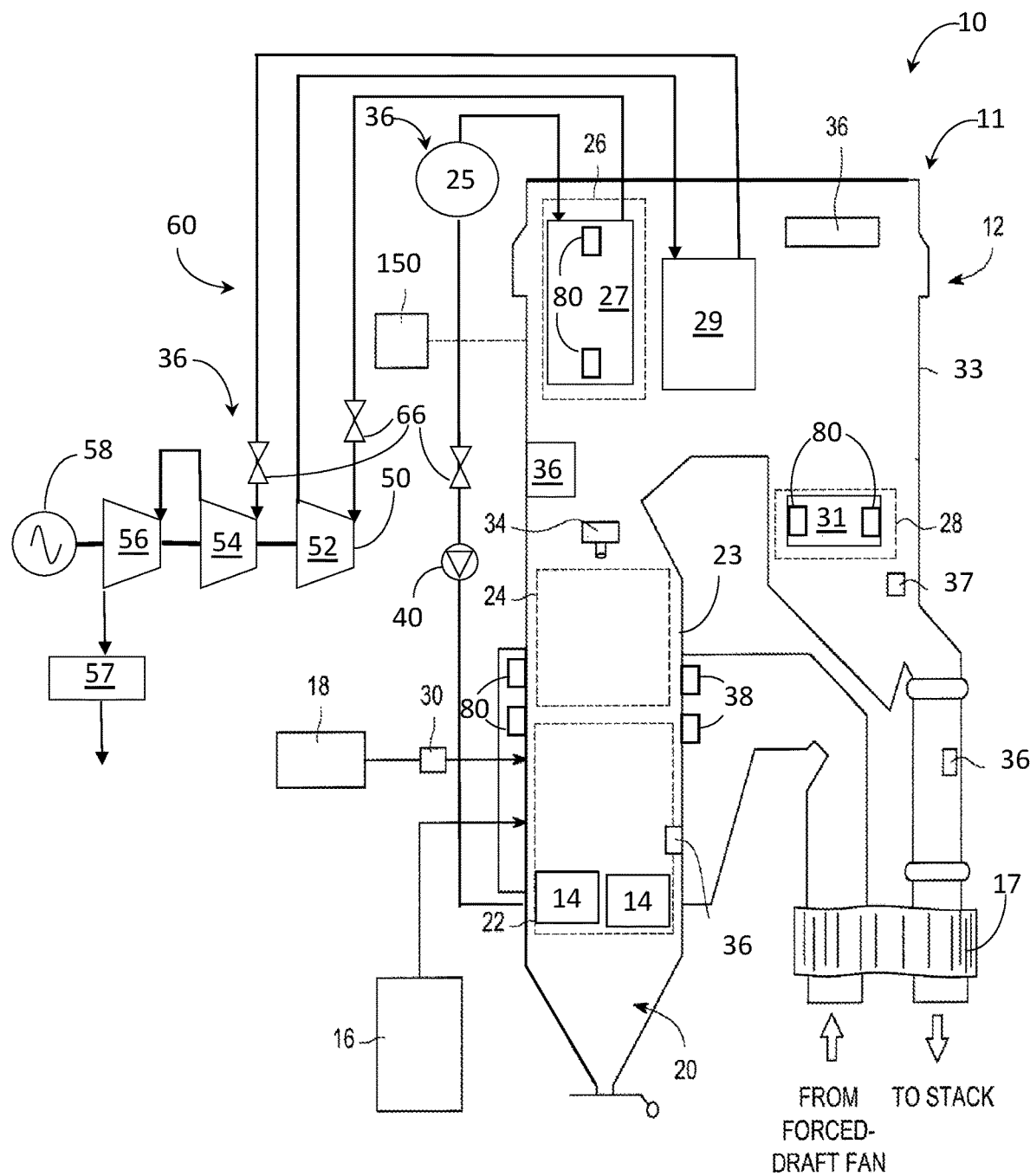
FIG. 1 is a simplified schematic illustration of a power generation system with a boiler in accordance with an embodiment.

Reference will be made below in detail to exemplary embodiments as described herein, examples of which are illustrated in the accompanying drawings. Wherever possible, the same reference characters used throughout the drawings refer to the same or like parts. While the various embodiments as described herein are suitable for use with heat recovery steam generation systems that include a combustion system, generally, a pulverized coal boiler such as for use in a pulverized coal power plant has been selected and described for clarity of illustration. Other systems may include other types of plants having heat exchangers, including, but not limited to, chemical plants, power generation plants, as well as boilers, furnaces and fired heaters utilizing a wide range of fuels including, but not limited to, coal, oil and gas. For example, contemplated boilers include, but are not limited to, both T-fired and wall fired pulverized coal boilers, circulating fluidized bed (CFB) and bubbling fluidized bed (BFB) boilers, stoker boilers, suspension burners for biomass boilers, including controlled circulation, natural circulation and supercritical boilers and other heat recovery steam generator systems.

Embodiments as described herein relate to a power generation system having a combustion system and a corrosion evaluation method and control scheme therefor that provides for evaluating data representing the corrosion characteristics of heat exchange surfaces in a boiler. In particular controlling a gas-gas or gas-liquid heat exchanger over the corrosion rate measured by a sensor located on a probe inserted on a side of the heat exchanger. In further detail, the described embodiments include a system, for example, a probe and control method for the operation of the heat exchanger at a minimum acceptable cold-side inlet temperature guided by the feedback from the corrosion rate of the probe located on the hot-side in contact with the gas phase. For example, in an embodiment, the corrosion sensor is equipped with real-time temperature controlled corrosion monitoring sensors and is capable of optimizing the temperature of a dynamic temperature profile of a gas-gas or gas-liquid heat exchanger surface for optimum thermal efficiency without operating within a corrosive environment. In an embodiment, the operator of the boiler can determine a particular or given corrosion behavior of the heat exchanger while optimizing the cold-side inlet temperature or dynamic temperature profile of the heat exchanger surface. The described embodiments are applicable to all types of boilers having heat exchange surfaces, but more specifically applicable to fossil fuel fired and waste fired boilers including tangentially fired boilers, as well as bubbling bed boilers, fluidized bed boilers, and circulating fluidized bed boilers.

FIG. 1 illustrates a power generation system 10 including a boiler wall evaluation system with combustion system 11 having a boiler 12 as may be employed in power generation applications in accordance with the several embodiments. The boiler 12 may be a tangentially fired boiler (also known as a T-fired boiler) or wall fired boiler. Fuel and air are introduced into the boiler 12 via the burner assemblies 14 and/or nozzles associated therewith. The combustion system 11 includes a fuel source such as, for example, a pulverizer 16 that is configured to grind fuel such as coal to a desired degree of fineness. The pulverized coal is passed from the pulverizer 16 to the boiler 12 using primary air. An air source 18 provides a supply of secondary or combustion air to the boiler 12 where it is mixed with the fuel and combusted, as discussed in detail hereinafter. Where the boiler 12 is an oxy-fired boiler, the air source 18 may be an air separation unit that extracts oxygen from an incoming air stream, or directly from the atmosphere.

The boiler 12 includes a hopper zone 20 located below a main burner zone 22 from which ash may be collected for subsequent removal. The bottom of the boiler 12 is provided with a grid 32, on the one hand, for introducing combustion or suspending or fluidizing gas, (for bed-type boilers) called primary air or combustion air, that is pumped into the boiler 12 by a fan 34 via the air preheater 17, and, on the other hand, for removing bottom ash and other debris from the boiler 12. The boiler 12 also includes a main burner zone 22 (also referred to as a windbox) where the air and an air-fuel mixture is introduced into the boiler 12, a burnout zone 24 where any air or fuel that is not combusted in the main burner zone 22 gets combusted, a superheater zone 26 with superheater 27 where steam can be superheated by the combustion flue gases. The boiler 12 also includes an economizer zone 28 with an economizer 31 where water can be preheated prior to entering a mixing sphere or drum (25) to feed water to the waterwall 23. In the main burner zone 22 controlled flows of primary air, pulverized coal, and secondary air are introduced into the combustion system 11 to effect the formation therein of a rotating fireball. The rotating fireball is a combustion process of the type which results in the release of material that contributes to depositions on the fireside surfaces of the water wall 23. Carbon based combustion by-product builds up as slag and/or ash on the fireside surfaces of the water wall 23. The boiler feed water entering the economizer 31 originates from the use in the steam turbine 50 and a condenser 57 downstream of the steam turbines 50. The condensate is first heated by steam by means of one or more low-pressure preheaters (not shown) before entering the economizer 31, Pumps 40 may be employed to aid in circulating water to the waterwall 23 and through boiler 12.

Combustion of the fuel with the primary and secondary air within the boiler 12 produces a stream of flue gases that are ultimately treated and exhausted through a stack downstream from the economizer zone 28. The often final step of collecting heat from the flue gases takes place in the combustion air preheater 17, where the flue gas heat is used to heat the air that is used as combustion air in the combustion system 11, The air preheater 17 is followed in the flue gas path by an electrostatic filter/precipitator or a bag filter (not shown) that separates any solid particles left in the flue gases before the flue gases are vented to the atmosphere via a stack. As used herein, directions such as "downstream" means in the general direction of the flue gas flow. Similarly, the term "upstream" is opposite the direction of "downstream" going opposite the direction of flue gas flow.

Generally, in operation of the power generation system 10 and combustion system 11, the combustion of fuel in the boiler 12 heats water in the waterwalls 23 of the boiler 12, which then passes through the steam drum (or equivalent), hereinafter referred to as drum 25 to the superheater 27 in the superheater zone 26 where additional heat is imparted to the steam by the flue gases. The superheated steam from the superheater 27 is then directed via a piping system shown generally as 60 to a high pressure section 52 of turbine 50, where the steam is expanded and cooled to drive turbine 50 and thereby turn a generator 58 to generate electricity. The expanded steam from the high pressure section 52 of the turbine 50 may then be returned to a reheater 29 downstream from the superheater 27 to reheat the steam, which is then directed to an intermediate pressure section 54 of turbine 50, and ultimately a low pressure section 56 of the turbine 50 where the steam is successively expanded and cooled to drive turbine 50.

As illustrated in FIG. 1, the combustion system 11 includes an array of sensors, actuators and monitoring devices to monitor and control the combustion process and the resulting consequences with respect to boiler operation. For example, temperature and pressure monitors shown generally and collectively as 36 are employed throughout the system to ensure proper control, operation and ensure that operational limits are not exceeded. In another example, the combustion system 11 may include a plurality of fluid flow control devices 30 that supply secondary air for combustion to each fuel introduction nozzle associated with the burner assemblies 14. In an embodiment, the fluid flow control devices 30 may be electrically actuated air dampers that can be adjusted to vary the amount of air that is provided to each fuel introduction nozzle associated with each burner assembly 14. The boiler 12 may also include other individually controllable air dampers or fluid flow control devices (not shown) at various spatial locations around the furnace. Each of the flow control devices 30 is individually controllable by a control unit 150 to ensure that desired air/fuel ratios and flame temperature are achieved for each nozzle location.

FIG. 1 also illustrates a backpass (or back draft section) 33 of the boiler 12 downstream from the superheater 27, reheater 29, and economizer 31 in economizer zone 28. The backpass 33 may also be fitted with a monitoring device 37. The monitoring device 37 may optionally be configured for measurement and assessment of gas species such as carbon monoxide (CO), carbon dioxide ($CO_2$), mercury (Hg), sulfur dioxide ($SO_2$), sulfur trioxide ($SO_3$), nitrogen dioxide ($NO_2$), nitric oxide (NO) and oxygen ($O_2$) within the backpass 33. $SO_2$ and $SO_3$ are collectively referred to as SOx. Similarly, $NO_2$ and NO are collectively referred to as NOx.

Continuing with the operation of the boiler 12, optionally a predetermined ratio of fuel and air is provided to each of the burner assemblies 14 for combustion. As the fuel/air mixture is combusted within the furnace and flue gases are generated, the combustion process and flue gases generated are monitored. In particular, various parameters of the fireball and flame, conditions on the walls of the furnace, and various parameters of the flue gas may be sensed and monitored. These parameters are transmitted or otherwise communicated to the combustion control unit 150 where they are analyzed and processed according to a control algorithm stored in memory and executed by a processor. The control unit 150 is configured to control the fuel provided to the boiler 12 and/or the air provided to the boiler 12, in dependence upon the one or more monitored combustion and flue gas parameters and furnace wall conditions.

Furthermore, the power generation system 10 also includes an array of sensors as denoted generally as 36 and 38, actuators and monitoring devices to monitor and control the corrosion processes associated with steam generation, in accordance with the described embodiments. For example, in an embodiment sensor system 80 may be a temperature controlled/compensated corrosion sensing system 80 as described further herein and subsequently referred to as corrosion system 80. In other instances, each sensor 36 may be a temperature sensor, pressure sensors, and the like. In an embodiment, the corrosion sensing system 80, temperature and pressure sensors 36, and the like may each be operably connected to the control unit 150 or another controller as needed to implement the methodologies and functions described herein. In addition, the power generation system 10 may include a plurality of fluid flow control devices 66, that, in an example, control the flow of water or steam in the system 10. In an embodiment, the fluid flow control devices 66 may be electrically actuated valves that can be adjusted to vary the amount of flow there through. Each of the fluid flow control devices e.g., 66 is individually controllable by a control unit 150.

Corrosion can be particularly deleterious to the components of the boiler. Corrosion, is primarily the direct result of the combustion byproducts of the fuels employed. In particular, gas species such as SOx, NOx, and the like, generated from fossil fuels and solid waste fuels can be particularly corrosive. It will be understood by one of ordinary skill in the art that certain combustion vessels, such as those fired by natural gas, do not corrode or deteriorate in the manner of a combustion vessel fired by coal or solid waste. In a solid waste or coal fired combustion vessel, corrosion or deterioration of the walls of the combustion vessel occurs with regularity. Measuring, evaluating and minimizing such corrosion is highly advantageous.

Thermally-efficient operation of a boiler 12 necessitates heat integration using non-contact gas-liquid and gas-gas heat exchangers including, but not limited to the water wall 23, superheater 27, reheater 29 or economizer 31. As an example, an economizer's function is to increase water temperature to an "approach" temperature near the saturation temperature. Approach temperature is generally selected to ensure maximum heat energy absorption efficiency and operational flexibility. An air preheater (APH) is any device designed to heat air before another process (for example, combustion in a boiler) again, with the primary objective of increasing the thermal efficiency of the process.

Figure 2:
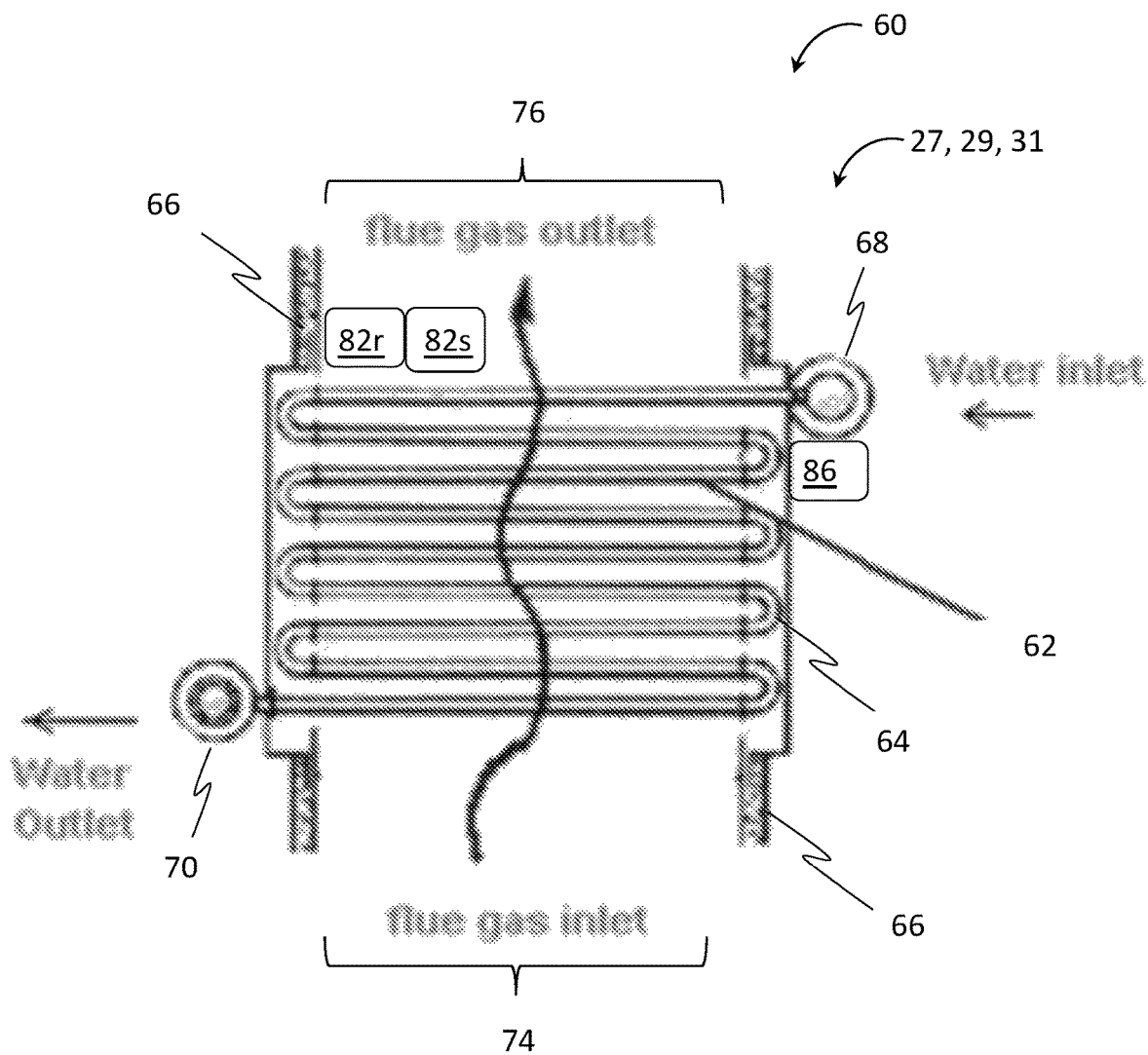
FIG. 2 is an illustration of a section of an example heat exchanger in accordance with an embodiment.

FIG. 2 depicts an example heat exchanger 60, for example, a portion of interest of a water wall 23, superheater 27, reheater 29 or economizer 31, and the like of the boiler 12 shown in FIG. 1. In one example, the heat exchanger 60 is the economizer 31 of the boiler 12 and comprises individual water or steam tubes 62 laid side by side connected by end bends 64 and brackets 66 as illustrated. The water/steam tubes 62 having a water or steam inlet 68 and an outlet 70. The heat exchanger 60 has a flue gas inlet 74 and a flue gas outlet 76. The water tubes 62 in the illustrated embodiment are oriented generally perpendicular to the vertical axis of the boiler 12 and the path of the flue gases. It should be appreciated that while the heat exchanger 60 as referenced herein is described with respect to having water tubes and a water inlet and outlet, such description is merely for the purpose of illustration. The heat exchanger 60 could be of any variety and operating with any fluid working medium as is well appreciated in the art. For example, the heat exchanger 60 could be gas-gas or liquid gas without loss of generality.

In an embodiment, one or more corrosion sensor system (s) 80 may be arranged in modules along the heat exchanger 60, e.g., economizer 31, reheater 29, superheater 27, and the like as discussed herein. Generally, in the case where the hot side of the heat exchanger 60, for example an economizer 31, is a gas phase containing potentially corrosive species, corrosion may occur, for the most part is avoided because of the higher gas temperatures. However, as the gas temperature is lowered, e.g., as the flue gases impart heat to the medium e.g., water/steam in the heat exchanger, corrosion becomes more likely, particularly as the dew point for the flue gases is approached. Accurate prediction of the conditions at which corrosion will be initiated and the relative sensitivity of the corrosion rate to process conditions is difficult as the exact dew point varies as a function of numerous variables including exact temperatures, fuel composition flue gas composition, heat exchanger materials and the like. Further, the conditions may change over time as the surfaces of the heat exchanger 60 get contaminated over time (fouling) and the process condition at the surface differs greatly from the bulk gas phase conditions. During transients (such as load change on the heat exchanger 60 or outages for maintenance) the conditions experienced may vary dramatically in a short period of time in manners that greatly affect the dynamics of corrosion mechanisms. Failure to maintain the heat exchanger 60 under non-corroding operating conditions can be costly and undesirable. For example, corrosion under acid dew point conditions in a heat recovery steam generator powerplant 10 can lead to plant outages or even loss of permit due to the negative repercussions of corrosion. Conversely, always maintaining heat exchange surfaces at temperatures above dew point (to avoid corrosion) reduces efficiency of the heat exchangers. Yet, the minimum achievable temperature under safe and economically-viable operation is sought. Therefore, in an embodiment a system and technique for evaluating corrosion conditions in a heat exchanger 60 exposed to flue gases is presented.

Figure 3:
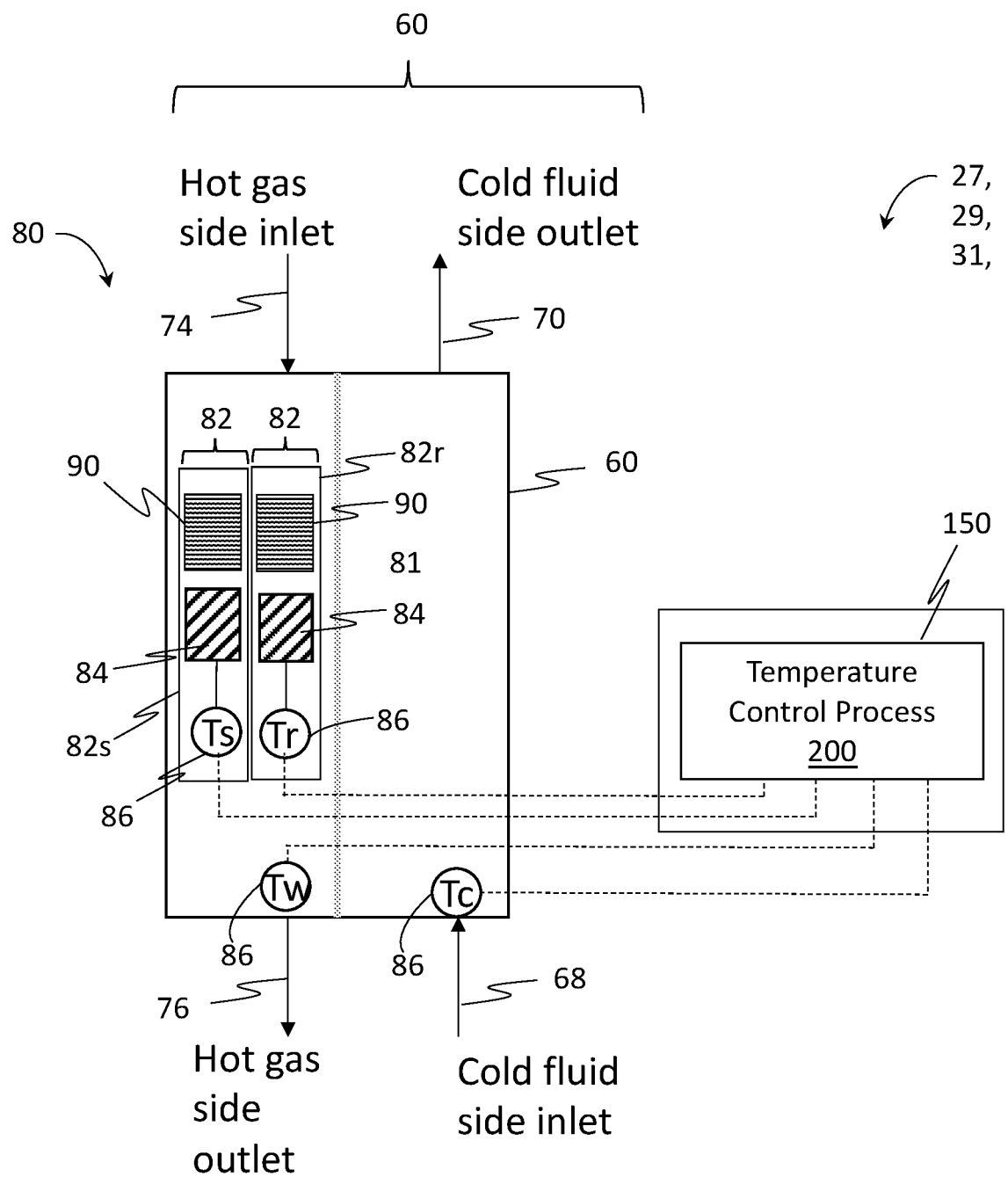
FIG. 3 is a schematic illustration of a heat exchanger of FIG. 2 including corrosion sensing system in accordance with an embodiment.

Turning to FIG. 3 as well, a simplified block diagram is depicted of heat exchanger 60 with a corrosion sensing system 80 in accordance with an embodiment. In an embodiment, a corrosion sensing system 80 and control process 200 (See also FIG. 4) includes the control unit 150 to achieve desired performance optimization for operation of the heat exchanger 60 (maximum heat exchange with acceptable corrosion rate is provided. The corrosion sensing system 80 and control process 200 facilitates determining corrosion characteristics and optimizes controlling the flows through a heat exchanger 60. In particular, control of fluid flow through the heat exchanger 60 to achieve a minimum acceptable temperature for the cold-side inlet 62 based at least in part on the feedback from the corrosion rate of the corrosion sensing system 80 located on the hot-side of the heat exchanger 60 in contact with the gas phase heat exchange medium, e.g., flue gases.

In an embodiment, the corrosion sensing system 80 employs one or more corrosion sensing devices 82 and temperature sensors 86 disposed on or at the heat exchanger 60 where condensation/deposition may (or preferably, is more likely to) occur. For example, more particularly generally at the hot-side, or in particular the hot side outlet 76 of the heat exchanger 60 and in contact with the gas phase of the heat exchange medium e.g., flue gas in/at outlet 76. The corrosion sensing devices 82 include corrosion sensors 84 coupled with temperature sensors 86 to facilitate monitoring the corrosion at a given selected location for a selected temperature. One possible type of corrosion sensor 84 is an electrical resistance sensor, where the electrical resistance sensor is piece of material 81 for which the temperature is measured, and for which the temperature is controlled, and where the sensor's metal thickness is calculated over time (as it corrodes). The changing resistance for a selected temperature of operation may readily be correlated to a corrosion rate. In an embodiment, the metallurgy of the corrosion sensor 84 and the sample material 81 is selected to be the same as the heat exchanger 60 so that the sensor exhibits the same corrosion environment and characteristics as the heat exchanger 60. Therefore, in an embodiment, the corrosion sensing system 80 includes a corrosion sensing device 82 with an electrical resistance/corrosion sensor 84 comprising a piece of material (in one instance, of the same material as the heat exchanger 60) coupled to it, and a temperature sensor 86 measuring the temperature of the respective sensing device 82. The electrical resistance may be measured employing known techniques such as an applied voltage and measured current, Wheatstone bridge, and the like. In one embodiment, more than one temperature-controlled corrosion sensing device(s) 82 is used. For example, in one embodiment two or more corrosion sensing devices 82r, 82s are employed where one corrosion sensing device 82r has temperature denoted Tr that is controlled to track the corrosion at hot gas outlet skin temperature denoted Tw of the heat exchanger 60 e.g., (current operation temperature of the material of the heat exchanger 60), while the other corrosion sensing device 82s is set as a "scout" at a different temperature denoted Ts (e.g., an anticipated temperature for improved performance with acceptable corrosion rate) for evaluation potential corrosion associated with differing temperatures. In another embodiment, the metallurgy used for one corrosion sensing device 82, for example the scout, 82s, may be different from the actual metallurgy of the existing heat exchanger 60.

Figure 4:
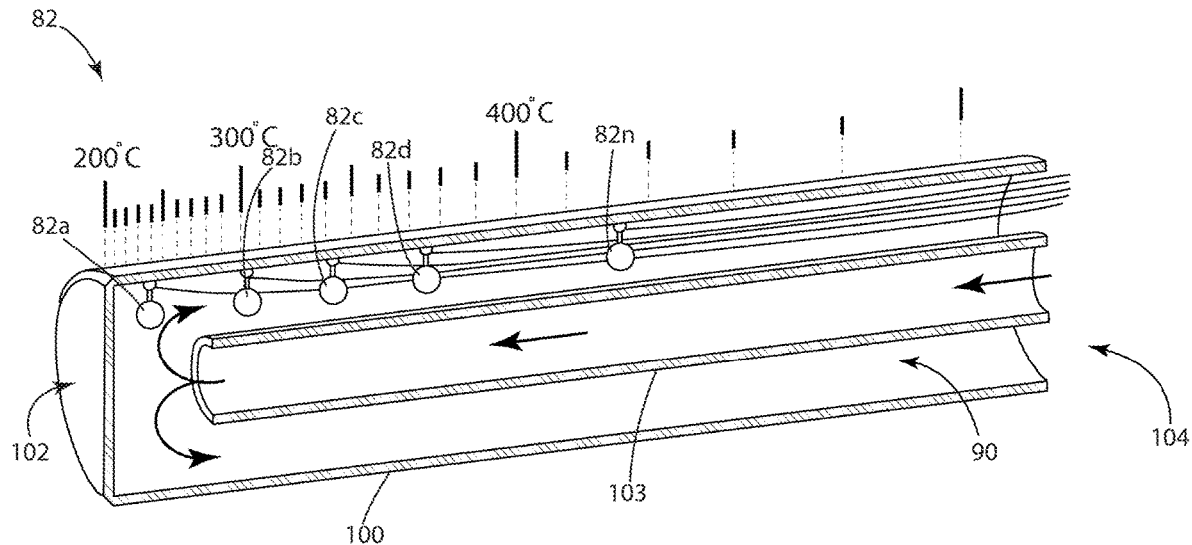
FIG. 4 is a diagrammatic depiction of a corrosion sensor module in accordance with an embodiment.

Employing a different metallurgy may enable evaluation to determine the fitness a new metallurgy in the heat exchanger application. In an embodiment, the temperature Tw is measured as the "coolest" point on the heat exchanger 60 e.g. near or at the hot gas outlet 76, but it need not necessarily be at that location. In one embodiment, as depicted in FIG. 4, more than two corrosion sensing devices 82 are used. The corrosion sensing system 80 of the described embodiments, may include a plurality of temperature-controlled corrosion sensing devices 82, denoted 82a, 82b, 82c, 82d, . . . 82n, each including an electrical resistance/corrosion sensor 84 coupled with a temperature monitoring sensor 86.

In addition, in an embodiment the temperature of the system 80 and more particularly one or more corrosion sensing device 82 is controlled over time to facilitate correlation between the temperature and measured corrosion. In an embodiment, the skin temperature of the sensing device 82, and more particularly the electrical resistance/corrosion sensor 84 may be controlled and the corrosion rate is monitored in real time based on the controlled temperatures. In an embodiment, each corrosion sensing device 82 can have a dedicated or a common temperature compensation device (e.g., cooling system) 90 that allows multiple skin temperatures at the various corrosion sensing devices 82. In one embodiment, the corrosion sensing system 80 employs separate temperature compensated corrosion sensing devices 82. In another embodiment, the corrosion sensing system 80 is composed of a tube 100, preferably of the same material (e.g., of the heat exchanger 60) for which corrosion monitoring is desired closed at a distal end 102 for insertion in the flue gas. A temperature compensation device 90, in one example a cooling device 104, is disposed within the tube 100 and operable to maintain a selected number of control temperatures, which are independently adjustable/controlled. In an embodiment, the cooling device 104 provides cooling air directed via a tube 103 substantially concentric with the tube 100 operable to direct cooling air to the closed distal end 102 of the tube 100, which is reflected back toward the open end of the tube 100. In this manner, by directing more or less air, or cooler air the temperature at the distal end 102 of the tube 100 may be controlled precisely to a selected temperature. The temperature being selected for the corresponding corrosion characteristics of the given material, location, and the like. In another embodiment, the temperature compensation device 90 may be configured as a thermoelectric device, e.g., such as a Peltier device, whereby a current is passed through a semiconductor material attached to each corrosion sensing device 82 to establish a temperature differential across the material, which can be utilized to provide cooling.

Continuing with FIGS. 3 and 4 as well, in operation, each temperature monitoring sensor 86 is operable to monitor the temperature of the corrosion sensing device 82 or the skin temperature of the heat exchanger where applied, e.g., Tw and Tc as depicted measure temperatures on the heat exchanger surfaces while Tr, and Ts are temperatures of the respective corrosion sensing devices 82r and 82s. In an embodiment, as referred to above, one corrosion sensing device 82 (denoted as a "reference" sensing device 82r) has its temperature controlled to closely track the surface temperature of the heat exchanger 60, for which corrosion should be monitored, e.g. Tw. In an embodiment, preferably, the reference sensing device 82r is of the same metallurgy as the hot, gas-side surface of the heat exchanger 60 and tracks the exposure history (providing very similar conditions at the sensor surface as are seen at that heat exchanger surface). As a result, based on the variations in electrical resistance monitored in operation as correlated to the measured temperatures from the temperature sensor 86, the corrosion at a given time may be ascertained and likewise, as measured over time, a corrosion rate determined. In particular, for example in an embodiment, for measurement an electrical resistance from sensor(s) 84, the resolution in the metal thickness can be lower than 1 Angstrom, allowing for continuous online monitoring in filtered air environment. In more difficult environments, corrosion trends and rates as measured by the metal thicknesses between 2 elapsed points in time may take longer time to establish (making sure a measurement duration is selected that provides a sufficient signal-to-noise ratio). In an embodiment, as depicted in FIG. 4, measurements of resistance may me made over selected durations to facilitate determining a corrosion rate, at a given temperature for the heat exchanger 60. Should the corrosion rate exceed a selected threshold, the cold inlet temperature may then be adjusted to achieve a desirable corrosion rate. In some embodiments the cold inlet temperature is monitored to facilitate correlation with determined corrosion rates and control schemes associated with the cold inlet temperature for the heat exchange medium (e.g., water/steam). In one embodiment, if the corrosion rate is higher than a selected threshold, the cold inlet temperature is controlled to be reduced slightly to reduce the temperatures differential across the heat exchanger 60 and thereby reduce the expected corrosion to a more acceptable level.

Optionally, in another embodiment, a second corrosion sensing device 82 (denoted as a "scouting" sensing device 82s) is set and controlled to a different targeted temperature of operation or targeted dynamic temperature profile that is expected to be applied to the heat exchanger 60 in the future. The corrosion and corrosion rates associated with this scout sensing device 82s may also be determined. In an embodiment where a "scout" sensor is selected and controlled at a different temperature, the difference in corrosion rates over the temperature change (to the reference sensor) determines the gradient necessary to select the preferred temperature set point for the heat exchanger cold-side inlet. In an embodiment, for both sensing devices 82r, 82s, the corrosion rate is monitored in real time by the process 200 executing on controller 150. In an embodiment, the feedback on the relative or absolute corrosion rates as measured from the reference corrosion sensing device 82r and the scout corrosion sensing device 82s is used to determine if a new temperature set-point or dynamic temperature profile is suitable from a corrosion point of view for the heat exchanger 60. In other words, if the corrosion profile as is less than anticipated, a lower cold side temperature at the inlet 68 of the heat exchanger may be possible. Conversely, if the corrosion as measured is greater than anticipated, the temperature differential in the heat exchanger 60 may need to be reduced to reduce or control the rate of corrosion. The process 200 may be iterated ahead of any modification to the plant operation, whether associated with anticipating a transient or optimizing thermal efficiency under achieved process conditions. In an embodiment, based on the expected demands of the heat exchanger 60, the cold side inlet temperature e.g., as measure in some embodiments as Tc, may then be controlled to ensure that the desired corrosion characteristics are achieved. In an embodiment, the cold side inlet temperature target may be controlled by controlling the temperature and/or flow rate for heat exchange medium e.g., water/steam passed through the heat exchanger 60.

In one embodiment, more than two temperature-controlled corrosion sensing devices 82 are employed so that different temperature set points or dynamic temperature profiles can be tested simultaneously and their impact on corrosion measured in real time. For both sensors, the corrosion rate is monitored in real time and the feedback on the relative or absolute rates is used to determine if the new temperature set point or dynamic temperature profile is suitable from a corrosion point of view. The process is iterated ahead of any modification to the plant operation whether associated with anticipating a transient or optimizing thermal efficiency under achieved process conditions.

Figure 5:
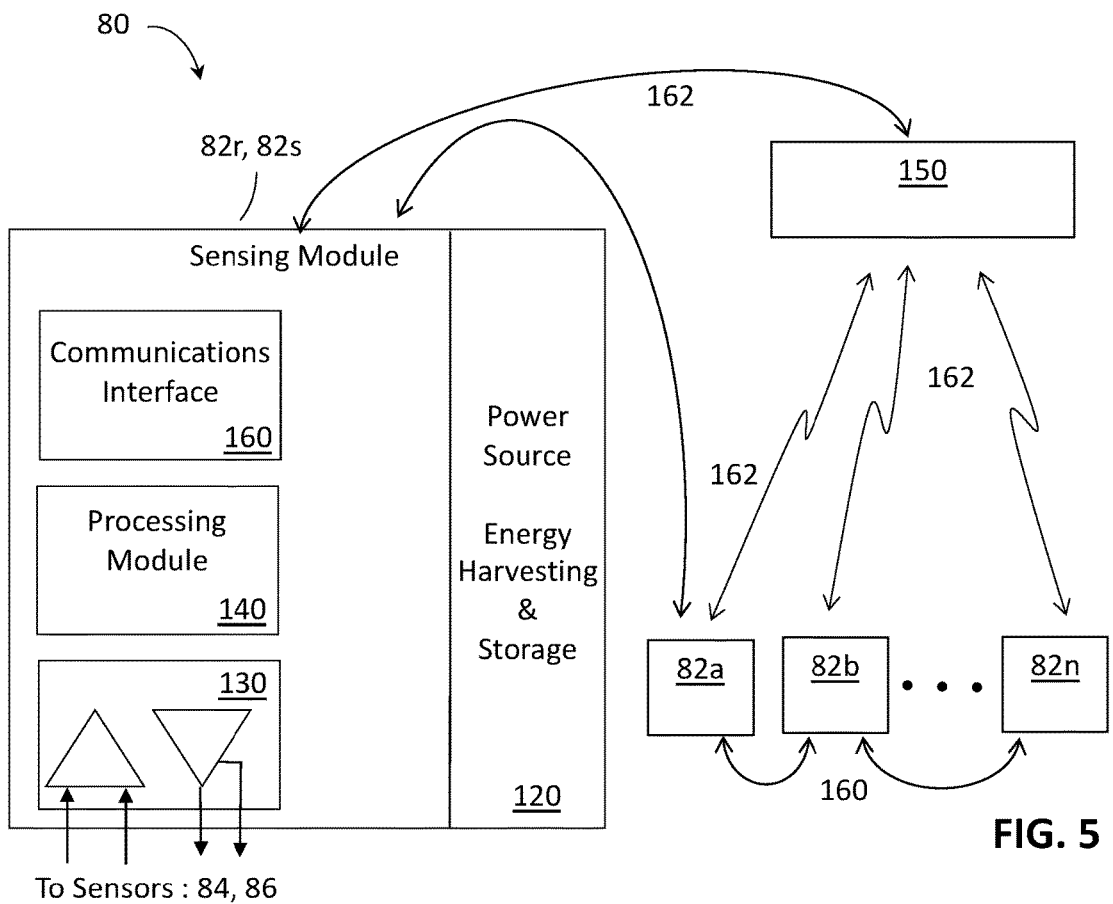
FIG. 5 is a simplified block diagram illustration of corrosion sensing module in accordance with an embodiment.
Figure 6:
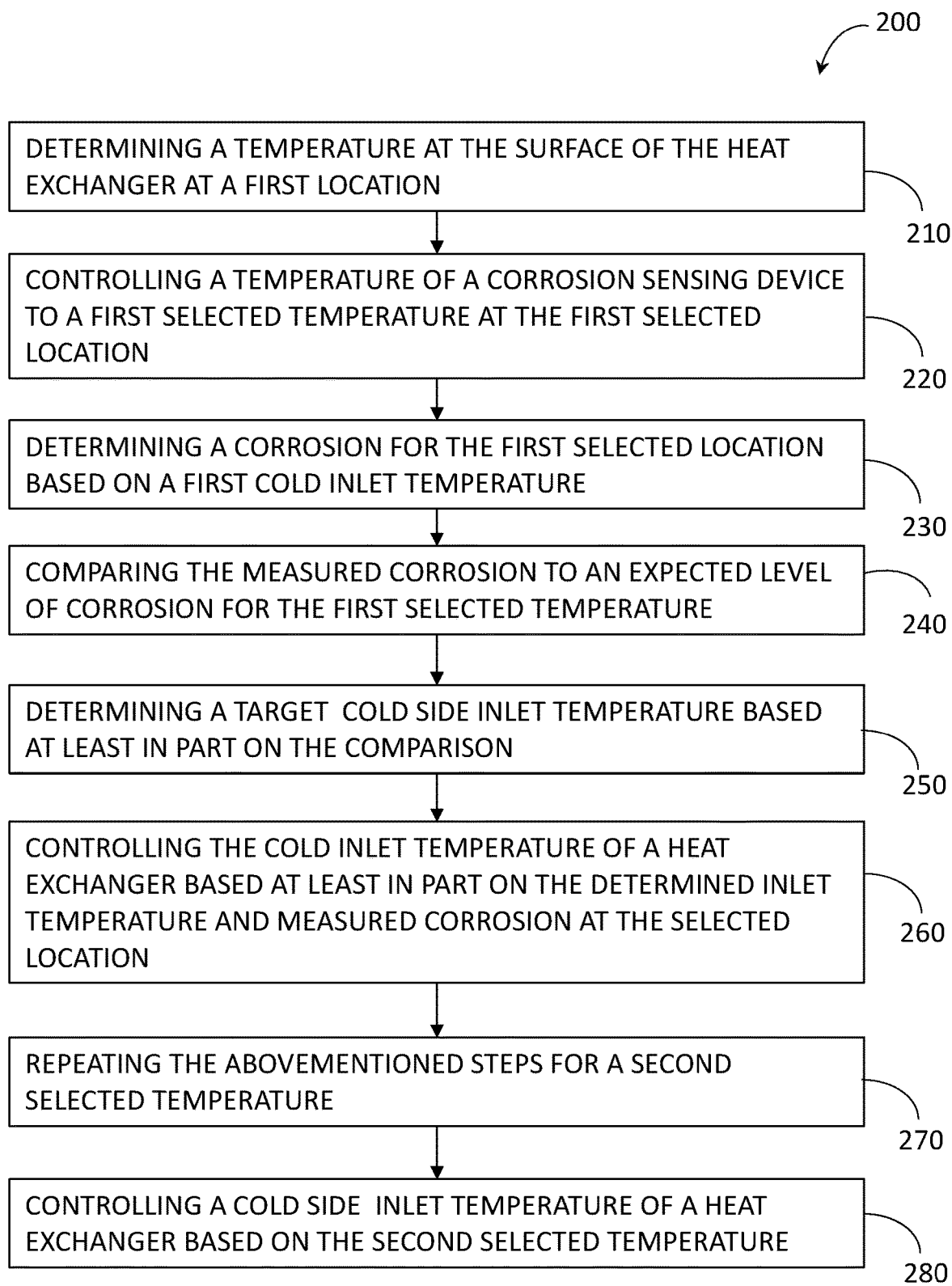
FIG. 6 is a flow chart illustration of heat exchanger corrosion determination and control methodology in accordance with an embodiment.

Turning now to FIG. 5, the corrosion sensing system 80 and or control unit 150 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, in an embodiment, either the corrosion sensing system 80 and/or control unit 150 or both may be implemented as self-contained or modular components of the power generation system 10 include at least one processing module 140 and system memory/data storage structures, which may include random access memory (RAM) and read-only memory (ROM). The processor of the module 140 may include one or more conventional microprocessors, microcontrollers, and one or more supplementary co-processors such as math co-processors, or the like. The data storage structures discussed herein may include an appropriate combination of magnetic, optical and/or semiconductor memory, and may include, for example, RAM, ROM, flash drive, an optical disc such as a compact disc and/or a hard disk or drive. The processing module 140 and/or control unit 150 may be implemented in the form of an integrated microcontroller where each of the functions may be integrated into a single package. Moreover, the corrosion sensing system 80 may be implemented as a microcontroller including ASIC, or FPGA as needed to interface with various modules to implement the functionality, processing, and communications described herein. Additionally, a software application that adapts the corrosion sensing system 80 and modules therein or control unit 150 to perform the method 200 disclosed herein may be read into a main memory of the at least one processor from a computer-readable medium. Thus, embodiments of the present invention may perform the methods disclosed herein in real-time. The term "computer-readable medium," as used herein, refers to any medium that provides or participates in providing instructions to the at least one processor of the module 80 or control unit 150 (or any other processor of a device described herein) for execution.

Continuing with FIG. 5, in one embodiment, each of the sensors e.g. 84, 86 may be hard wired to the control unit 150. In another embodiment, the sensor interface 130 and processing are included in the sensing device 82 and the sensing device 82 communicates with the electrical resistance/corrosion sensors 84, and temperature sensors 86 as well as with the control unit 150. In an embodiment a low powered communications interface 160 is employed. The communications interface 160 is configured to interface with an interconnect/network 162, which interconnects the corrosion sensing devices 82 and one or more controllers such as control unit 150. The network 162 may be a mix of wired and wireless components, and can leverage the communications networks including an IP network. It should be understood that the interconnect/network 162 may comprise wired components or wireless components, or a combination thereof. Such wired components may include regular network cables, optical fibers, electrical wires, or any other type of physical structure over which the sensing modules 80, control unit 150 and other devices of the boiler system can communicate. In addition, the network 162 may include wireless components, and may include radio links, optical links, magnetic links, sonic links, or any other type of wireless link over which the corrosion sensing devices 82, and control unit 150 can communicate. The communications interface 160 may be wired or wireless or a combination thereof. In an embodiment, a wireless communications interface 160 and wireless network 162 are employed. For example, the communications interface 160 may employ various techniques, technologies and protocols to facilitate implementation of the described embodiments and are in no way limiting. For example, the communications interfaces 160 and network 162 could be implemented as Ethernet, WiFi®, Bluetooth®, NFC, and the like. The network 162 may be implemented employing a hub and spoke type construct or as mesh network construct. In some embodiments, a wireless mesh network may be employed to permit a plurality of corrosion sensing devices 82 deployed around a boiler 12 to communicate with each other, coordinate measurements, and pass data back to a control unit 150. Advantageously, combining a wireless local power source 120 with a wireless communication interface 160 and network 162 significantly reduces the installation cost for each sensor system 80 and the whole system.

It should be appreciated that while the boiler 12, and more specifically, integrated corrosion sensing system 80 and/or control unit 150 is described as including separated modules for a power source 120, sensor interface 130, processing module 140 and a communications interface 160, such description is merely for the purposes of example. In one more embodiments the functionality of all or some of the described modules may readily be integrated or combined as needed. For example, in an embodiment the functionality of the sensor interface 130, processing module 140, and communications interface 160 may be integrated in whole or part into a microcontroller, ASIC, FGPGA, and the like.

In the described embodiments, the method 200 monitors corrosion on a heat exchange surface of a heat exchanger 60 in a boiler system 12. The method initiates as depicted at process step 210 with monitoring the temperature Tw of the surface of the heat exchanger 60. As described herein, the measurement is made in the vicinity of the hot gas outlet 76, preferably, but not necessarily at the coolest point on the heat exchanger 60 or where condensation is likely to occur. The method 200 continues with controlling the temperature of the corrosion sensing device 82, e.g., 82r at the first location as depicted at process step 220. As depicted at process step 230, monitoring a corrosion of a corrosion sensing device 82 at the first selected location. In an embodiment the corrosion rate is determined by evaluating a resistivity measurement is compared to a resistivity measured at the known constant temperature over a measured selected duration to establish a known baseline and corrosion rate at that selected location and selected temperature, as depicted at process step 240. Based on the comparison for the measured corrosion, the method 200 continues at process step 250 with determining a target cold inlet temperature for the heat exchanger 60 based at least in part on the corrosion rate. The method 200 continues with controlling an inlet temperature of the heat exchanger 60 based at least in part on the measured corrosion rate as depicted at process step 260. The method 200 continues with optionally repeating the abovementioned steps for a second selected temperature as depicted at process step 270. Finally, as depicted at process step 280 the method 200 continues with controlling the inlet temperature of the heat exchanger 60 based at least in part on the measurements at the selected location and first selected temperature and the second selected temperature.

It should be appreciated that while various steps of the method 200 are depicted in a particular order, they need not be, and are described in such order merely for the purposes of illustrating the examples of the embodiments. Some steps may of discussion, some steps may readily be conducted in different order. In addition to operational savings, the power generation system of the described embodiments provides for capital cost savings on new heat exchanger design and construction. In particular, with the control system disclosed herein, it is possible to design/plan equipment for more efficient heat exchanger operation by maximizing heat exchanger efficiency while ensuring corrosion rates are constrained.

In an embodiment, described herein is a method of controlling corrosion of a heat exchanger, having a hot gas inlet and outlet and a cold side inlet and outlet. The method includes determining a temperature of the heat exchanger at a first selected location, controlling a temperature of a corrosion sensing device to a first selected temperature based on the temperature of the surface of the heat exchanger and determining a corrosion rate associated with the heat exchanger surface at the first selected location for the first selected temperature. The method also includes comparing the corrosion rate to an expected of corrosion rate, determining a cold side fluid inlet temperature target for the heat exchanger based at least in part on the comparing, the determined corrosion; and controlling a cold side fluid inlet temperature based at least in part on the determined inlet temperature target, determined corrosion rate, and expected corrosion rate.

In addition to one or more of the features described above, or as an alternative, further embodiments of the method may include controlling the temperature of the corrosion sensing device includes providing a temperature compensation device at the first selected location.

In addition to one or more of the features described above, or as an alternative, further embodiments of the method may include controlling is to a first selected temperature includes controlling the temperature of the corrosion sensing device to the current temperature of the heat exchanger.

In addition to one or more of the features described above, or as an alternative, further embodiments of the method may include that the determining a corrosion is based on measuring an electrical resistance at the first selected location.

In addition to one or more of the features described above, or as an alternative, further embodiments of the method may include that the electrical resistance at the first selected location is compared to a baseline electrical resistance measured under selected conditions.

In addition to one or more of the features described above, or as an alternative, further embodiments of the method may include that the selected conditions include the first selected location at the first selected temperature at an initial time.

In addition to one or more of the features described above, or as an alternative, further embodiments of the method may include that the controlling the inlet temperature is based at least in part on at least one of: controlling a flow rate of a heat exchange medium to the cold side inlet of the heat exchanger; and controlling temperature of a heat exchange medium to the cold side inlet of the heat exchanger.

In addition to one or more of the features described above, or as an alternative, further embodiments of the method may include controlling a temperature of a corrosion sensing device at the first selected location at the heat exchange surface of the heat exchanger to a second selected temperature; determining a corrosion rate associated with the heat exchange surface of the heat exchanger at the second selected temperature; comparing determined corrosion to an expected corrosion rate associated with the second selected temperature; determining a cold side inlet temperature target for the heat exchanger based at least in part on the comparing and measured corrosion rate at the second selected temperature; and controlling the cold side inlet temperature based at least in part on the determined cold side inlet temperature and measured corrosion rate at the second selected temperature.

In addition to one or more of the features described above, or as an alternative, further embodiments of the method may include that the second selected temperature is selected to based at least in part on an expected improved corrosion rate of the heat exchanger.

In addition to one or more of the features described above, or as an alternative, further embodiments of the method may include that the first selected location is based on likely corrosion of the heat exchange surfaces of the heat exchanger.

In addition to one or more of the features described above, or as an alternative, further embodiments of the method may include that the first selected location is selected to be in proximity to the hot gas outlet of the heat exchanger.

In another embodiment, described herein is a system for monitoring corrosion of a heat exchange surface of a heat exchanger. The system including a heat exchanger, having a hot gas inlet, a hot gas outlet a cold side inlet and a cold side outlet, a corrosion sensing device disposed at a first selected location at the heat exchange surface of the heat exchanger, the corrosion sensing device operable to measure a corrosion rate of the heat exchange surface for a first selected temperature, a temperature compensation device controllable and operable to control the temperature of the corrosion sensing device, and a temperature sensing device disposed in proximity to the first selected location, the temperature sensing device operable to measure a temperature of the heat exchanger at the first selected location. The system also includes a control device operable to control at least one of the temperature and flow of a heat exchange medium to the cold side inlet through the heat exchanger, and a controller in operable communication with the corrosion sensing device, the temperature compensation device, the temperature sensor and control device. At least one of the corrosion sensing device and the controller is operable to control the temperature compensation device to maintain the corrosion sensing device at the first selected temperature based at least in part on the temperature of the heat exchanger at the first selected location. At least one of the corrosion sensing device and the controller is operable to determine a corrosion rate of the heat exchange surface of the heat exchanger at the first selected location and execute a process for controlling a cold side inlet temperature of the heat exchanger based at least in part on the corrosion measured at the first location, an expected corrosion rate for the heat exchanger at the measured temperature of the heat exchanger at the first selected location.

In addition to one or more of the features described above, or as an alternative, further embodiments of the system may include a temperature sensor, the temperature sensor operable to measure the temperature of the heat exchanger surface about at the cold side inlet.

In addition to one or more of the features described above, or as an alternative, further embodiments of the system may include that the at least one of the corrosion sensing device and the controller is operable to execute a process for controlling the cold side inlet temperature of the heat exchanger based at least in part on the corrosion measured at the first location, an expected corrosion rate for the heat exchanger at the measured temperature of the heat exchanger at the first selected location, and the measured cold side inlet temperature.

In addition to one or more of the features described above, or as an alternative, further embodiments of the system may include the corrosion sensing device includes an electrical resistance sensor, the electrical resistance sensor operable to measure an electrical resistance of the heat exchange surface, and a temperature sensor operable to measure a temperature of the exchange surface in the vicinity of the corrosion sensing device.

In addition to one or more of the features described above, or as an alternative, further embodiments of the system may include the corrosion sensing device further includes a power source, the power source operable to provide power to the corrosion sensing device, a processor module; the processing module operable to execute a process for determining a corrosion based at least in part on the electrical resistance and the measured temperature, a communications module, the communications module operable to communicate with at least the controller.

In addition to one or more of the features described above, or as an alternative, further embodiments of the system may include a second corrosion sensing device disposed at the first selected location at the heat exchange surface of the heat exchanger, the second corrosion sensing device operable to measure a corrosion of the heat exchange surface at a second selected temperature.

In addition to one or more of the features described above, or as an alternative, further embodiments of the system may include controlling the cold side inlet temperature based at least in part on the determined cold side inlet temperature and measured corrosion rate at the second selected temperature.

In addition to one or more of the features described above, or as an alternative, further embodiments of the system may include that the second selected temperature is based at least in part on an expected improved corrosion rate of the heat exchanger.

In addition to one or more of the features described above, or as an alternative, further embodiments of the system may include that the first selected location is based on likely corrosion of the heat exchange surfaces of the heat exchanger.

In addition to one or more of the features described above, or as an alternative, further embodiments of the system may include that the first selected location is selected to be in proximity to the hot gas outlet of the heat exchanger.

Finally, it is also to be understood that the system 10 and control unit 150 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system may include at least one processor and system memory/data storage structures, which may include random access memory (RAM) and read-only memory (ROM). The at least one processor of the system 10 may include one or more conventional microprocessors and one or more supplementary co-processors such as math co-processors or the like.

The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. Thus, embodiments of the present invention may perform the methods disclosed herein in real-time. The term "computer-readable medium," as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, solid state drive (SSD), magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the described methods/processes. Therefore, embodiments as described herein are not limited to any specific combination of hardware and/or software.

As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the described embodiments are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they are by no means limiting and are exemplary embodiments. Many other embodiments will be apparent to those of skill in the art upon reviewing the above description. The scope of the invention should, therefore, be determined with reference to the appended claims. Such description may include other examples that occur to one of ordinary skill in the art and such other examples are intended to be within the scope of the claims if they have structural elements that do not differ from the literal language of the claims, or if they include equivalent structural elements with insubstantial differences from the literal languages of the claim. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

What is claimed is:

1. A method of controlling corrosion of a heat exchange surface of a heat exchanger having a hot gas inlet, a hot gas outlet, a cold side fluid inlet and a cold side outlet, the method comprising:
   determining a temperature of a surface of the heat exchanger at a first location;
   controlling a temperature of a corrosion sensing system to a first temperature based on the temperature of the surface of the heat exchanger at the first location, the corrosion sensing system including a plurality of corrosion sensing devices, each corrosion sensing device having a corrosion sensor coupled to a temperature sensor, wherein controlling the temperature of the corrosion sensing system includes providing a temperature compensation device at the first location integrated with the corrosion sensing system, wherein the temperature compensation device includes a first tube with a closed end and an opposing open end housing the corrosion sensing system therein and a second tube disposed within the first tube, each of the plurality of corrosion sensing devices coupled to an inner wall of the first tube in a spaced arrangement, wherein the second tube is open at a first end and an opposing second end, the second tube configured to receive cooling air that flows therethrough towards the closed end of the first tube, the cooling air reflecting off the closed end of the first tube back towards the open end of the first tube, the reflected cooling air directly cooling each of the plurality of corrosion sensing devices while flowing towards the open end of the first tube, wherein the temperature compensation device controls the cooling of each of the plurality of corrosion sensing devices that form the corrosion sensing system as a function of an amount of the cooling air that is directed through the first tube and the second tube, wherein each of the plurality of corrosion sensing devices includes a microcontroller having a communications interface enabling communication with the other corrosion sensing devices that form the corrosion sensing system and a control unit operatively coupled to the plurality of corrosion sensing devices, a processing module, a sensor interface to communicate with a corresponding corrosion sensor and temperature sensor, and a power source to power the communications interface, the processing module, and the sensor interface, wherein the plurality of corrosion sensing devices are configured to communicate with each other, coordinate measurements and pass data relating to the coordinate measurements to the control unit;
   determining a corrosion rate associated with the heat exchange surface of the heat exchanger at the first location for the first temperature;
   comparing the corrosion rate to an expected corrosion rate associated with the first location and first temperature;
   determining a cold side fluid inlet temperature target for the heat exchanger based at least in part on the comparing the corrosion rate at the first location; and
   controlling a cold side fluid inlet temperature based at least in part on the fluid inlet temperature target, corrosion rate, and an expected corrosion rate.

2. The method as recited in claim 1, wherein the controlling the temperature of the corrosion sensing system to the first temperature includes controlling the temperature of the corrosion sensing system to a current temperature of the heat exchanger.

3. The method as recited in claim 1, wherein the determining of the corrosion rate associated with the heat exchange surface of the heat exchanger is based on measuring an electrical resistance at the first location.

4. The method as recited in claim 3, wherein the electrical resistance at the first location is compared to a baseline electrical resistance measured under selected conditions.

5. The method as recited in claim 4, wherein the selected conditions include the first location at the first temperature at an initial time.

6. The method as recited in claim 1, wherein the controlling the cold side fluid inlet temperature is based on at least one of:
   controlling a flow rate of a heat exchange medium to the cold side inlet of the heat exchanger; and
   controlling a temperature of the heat exchange medium to the cold side inlet of the heat exchanger.

7. The method as recited in claim 1, further comprising:
   controlling a temperature of the corrosion sensing system at the first location at the heat exchange surface of the heat exchanger to a second temperature;
   determining a second corrosion rate associated with the heat exchange surface of the heat exchanger at the second temperature;
   comparing the second corrosion rate to an expected corrosion rate associated with the second temperature;
   determining a second cold side inlet temperature target for the heat exchanger based at least in part on the comparing step and the second corrosion rate at the second temperature; and
   controlling the cold side inlet temperature based at least in part on the second cold side inlet temperature and second corrosion rate at the second temperature.

8. The method as recited in claim 7, wherein the second temperature is selected based at least in part on an expected improved corrosion rate of the heat exchanger.

9. The method as recited in claim 1, wherein the first location is based on likely corrosion locations of the heat exchange surfaces of the heat exchanger.

10. The method as recited in claim 9, wherein the first location is selected to be in proximity to the hot gas outlet of the heat exchanger.

11. A system for monitoring corrosion of a heat exchange surface of a heat exchanger, the system comprising:
   a heat exchanger having a hot gas inlet, a hot gas outlet, a cold side inlet and a cold side outlet;
   a corrosion sensing system disposed at a first location at the heat exchange surface of the heat exchanger to measure a corrosion rate of the heat exchange surface for a first temperature, wherein the corrosion sensing system includes a plurality of corrosion sensing devices, each corrosion sensing device having a corrosion sensor coupled to a temperature sensor;

a temperature compensation device integrated with the corrosion sensing system that is controllable and operable to control the temperature of the corrosion sensing system, wherein the temperature compensation device includes a first tube with a closed end and an opposing open end housing the corrosion sensing system device and a second tube disposed within the first tube, each of the plurality of corrosion sensing devices coupled to an inner wall of the first tube in a spaced arrangement, wherein the second tube is open at a first end and an opposing second end, the second tube configured to receive cooling air that flows therethrough towards the closed end of the first tube, the cooling air reflecting off the closed end of the first tube back towards the open end of the first tube, the reflected cooling air directly cooling each of the plurality of corrosion sensing devices while flowing towards the open end of the first tube, wherein the temperature compensation device controls the cooling of each of the plurality of corrosion sensing devices that form the corrosion sensing system as a function of an amount of the cooling air that is directed through the first tube and the second tube, wherein each of the plurality of corrosion sensing devices includes a microcontroller having a communications interface enabling communication with the other corrosion sensing devices that form the corrosion sensing system and a control unit operatively coupled to the plurality of corrosion sensing devices, a processing module, a sensor interface to communicate with a corresponding corrosion sensor and temperature sensor, and a power source to power the communications interface, the processing module, and the sensor interface, wherein the plurality of corrosion sensing devices are configured to communicate with each other, coordinate measurements and pass data relating to the coordinate measurements to the control unit;

wherein each temperature sensor associated with a corresponding corrosion sensing device is operable to measure a temperature of the heat exchanger at the first location;

wherein each processing module associated with a corresponding corrosion sensing device and the control unit are operable to control at least one of a temperature and a flow of a heat exchange medium to the cold side inlet through the heat exchanger; and wherein the control unit is in operable communication with the processing modules and the temperature sensors of the plurality of corrosion sensing devices, and the temperature compensation device, wherein at least one of the plurality of corrosion sensing devices and the control unit is operable to control the temperature compensation device to maintain the corrosion sensing system at the first temperature based at least in part on the temperature of the heat exchanger at the first location;

wherein at least one of the corrosion sensing system and the control unit is operable to determine a corrosion rate of the heat exchange surface of the heat exchanger at the first location and execute a process for controlling a cold side inlet temperature of the heat exchanger based at least in part on the corrosion measured at the first location, and an expected corrosion rate for the heat exchanger at the measured temperature of the heat exchanger at the first location.

12. The system as recited in claim 11, further including a cold side inlet temperature sensor operable to measure the temperature of the heat exchanger surface at the cold side inlet.

13. The system as recited in claim 12, wherein at least one of the corrosion sensing system and the control unit is operable to execute a process for controlling the cold side inlet temperature of the heat exchanger based at least in part on the corrosion rate measured at the first location, an expected corrosion rate for the heat exchanger at the measured temperature of the heat exchanger at the first location, and the measured cold side inlet temperature.

14. The system as recited in claim 11, wherein each corrosion sensor of the plurality of corrosion sensing devices comprises:
an electrical resistance sensor operable to measure an electrical resistance of the heat exchange surface.

15. The system as recited in claim 11, further including a second corrosion sensing system disposed at the first location at the heat exchange surface of the heat exchanger, the second corrosion sensing device operable to measure a corrosion rate of the heat exchange surface at a second selected temperature.

16. The system as recited in claim 15, wherein the control unit is configured to control the cold side inlet temperature based at least in part on the determined cold side inlet temperature and measured corrosion rate at the second temperature.

17. The system as recited in claim 15, wherein the second temperature is based at least in part on an expected improved corrosion rate of the heat exchanger.

18. The system as recited in claim 11, wherein the first location is based on likely corrosion of the heat exchange surfaces of the heat exchanger, and wherein the first selected location is selected to be in proximity to the hot gas outlet of the heat exchanger.

* * * * *